United States Patent [19]
Isley, Jr.

[11] Patent Number: 6,098,770
[45] Date of Patent: Aug. 8, 2000

[54] CLUTCH ASSEMBLY HAVING REACTION FORCE CIRCUIT

[75] Inventor: Loren D. Isley, Jr., Clarkston, Mich.

[73] Assignee: BorgWarner Inc., Troy, Mich.

[21] Appl. No.: 09/272,460

[22] Filed: Mar. 19, 1999

[51] Int. Cl.$^7$ .............................. F16D 13/04; F16D 27/08
[52] U.S. Cl. ......................... 192/35; 192/48.2; 192/84.7; 192/84.91
[58] Field of Search .............................. 192/35, 48.2, 84, 192/84.91, 84.7, 54.52

[56] References Cited

U.S. PATENT DOCUMENTS

| | | | |
|---|---|---|---|
| 5,083,986 | 1/1992 | Teraoka et al. | 475/86 |
| 5,884,738 | 3/1999 | Joslin et al. | 192/35 |

Primary Examiner—Charles A. Marmor
Assistant Examiner—Tisha D. Waddell
Attorney, Agent, or Firm—Brinks, Hofer, Gilson & Lione; Greg Dziegielewski

[57] ABSTRACT

A clutch assembly for disposition in a motor vehicle drive line includes an internal reaction force circuit. The clutch assembly includes a multiple disc friction clutch disposed adjacent an operator assembly which selectively applies force to the friction clutch to selectively transfer torque therethrough. The clutch components are disposed between a flange and a stop on an elongate member which functions as a reaction force member to self-contain the reaction force from the clutch operator. The clutch finds particular application in motor vehicle drive line components such as a rear (secondary) axle wherein it is disposed in pairs to independently control torque supplied to each axle and in applications where it is advantageous to contain or ground the reaction force generated by and associated with the clutch operator compactly within the clutch structure rather than its housing.

18 Claims, 3 Drawing Sheets

CLUTCH ASSEMBLY HAVING REACTION FORCE CIRCUIT

BACKGROUND OF THE INVENTION

The invention relates generally to multiple friction plate clutches for motor vehicle drive line components and more specifically to friction plate clutches having an internal reaction force circuit for use in pairs with a front or rear axle.

Vehicle drive line and control systems having both electric and hydraulic modulating clutches have found broad application in adaptive vehicle drive systems. Such systems generally monitor the speeds of the front and rear drive shaft or compute such speeds by averaging individual readings of the two front and two rear wheels and, upon determining a speed difference between the drive shaft speeds or average speeds of the wheels, energize the modulating clutch according to a predetermined program to drive the speed difference and thus wheel slip toward zero. Such systems may also monitor and adjust modulating clutch activity in response to throttle position, steering angle and other variables.

Typically, such modulating clutches are physically disposed in a transfer case, adjacent and driven by the output of the vehicle transmission, and operably disposed between the primary and secondary drive lines. Such systems are disposed in co-owned U.S. Pat. Nos. 5,407,024 granted Apr. 18, 1995 and 5,485,894 granted Jan. 23, 1996.

An alternate approach to vehicle skid control comprehends association of an individually operable clutch with each axle of a secondary, that is, part-time drive line. Selective, modulating activation of one or both of the clutches directs drive torque to one or both secondary drive wheels to adjust or correct vehicle yaw. An early system utilizing hydraulic clutches is disclosed in U.S. Pat. No. 4,681,180. Here, a control unit having steering angle, vehicle speed and engine torque inputs and adjust torque distribution between only the two rear wheels.

U.S. Pat. Nos. 5,195,901 and 5,119,900 both teach a vehicle having two independently operable rear axle clutches in a drive line which provides primary drive torque to the front wheels and selectively and independently provides torque to the rear wheels.

In U.S. Pat. No. 5,353,889, a rear axle includes a pair of hydraulically operated independent clutches controlled by associated hydraulic pressure clutches and pumps.

In U.S. Pat. No. 5,383,378, a twin clutch axle disposed at the front of a vehicle provide drive torque to the front (secondary) drive wheel in response to steering angle. U.S. Pat. No. 5,540,119 teaches a differential drive assembly for transferring rotational power without the use of conventional differential gearing. The device utilizes pairs of clutches and cam mechanisms which actuate said clutches in response a predetermined relative rotation.

While many problems have been addressed and new operational schemes achieved by the devices found in the prior art, it is apparent that certain problems have not been addressed. For example, it should be appreciated that, according to Newton's third law of motion, the direct or action force generated by a clutch operator to compress an adjacent clutch pack creates an equal and opposite reaction force which is transmitted through whatever structural components of the clutch assembly constitute the reaction force path or circuit.

Typically, such reaction force path will be through or contained in an outer housing in devices where the clutch pack is disposed adjacent the clutch operator and both are contained within the housing. Such a configuration can apply significant reaction force, not only to the housing, but also to whatever fasteners are utilized to secure the housing components together. Such a configuration can be disadvantageous, causing either fastener or housing failure or necessitating heavy and therefore costly housing and fastener configurations. Accurately controlled modulation of the clutches may also be compromised due to flexure or distortion of the housing or other components in the reaction force path. Accordingly, the operation of devices containing such clutches may be compromised. The present invention addresses such matters.

SUMMARY OF THE INVENTION

A clutch assembly for disposition in a motor vehicle drive line includes an internal reaction force circuit. The clutch assembly includes a multiple plate or disc friction clutch disposed adjacent an operator assembly which selectively applies compressive force to the friction clutch to selectively transfer torque therethrough. The clutch components are disposed on an elongate member. The elongate member includes a preferably integrally formed circular plate or flange which functions as a first stop against which one side of the clutch pack abuts. A circular collar which may, in fact, be an anti-friction bearing is retained on the elongate member by a pair of snap rings. The circular collar or anti-friction bearing functions as a second stop against which one side of the operator assembly abuts. The elongate member thus functions as a reaction force member and self-contains the reaction force generated by the clutch operation. The clutch operator may be a ball ramp assembly which is actuated by an electromagnetic coil. Alternatively, the operator may include an electric motor and cam assembly which generates compressive force. Direct acting hydraulic or air driven piston and cylinder operators or pilot and main clutches which are electrically, pneumatically or hydraulically operated are also useful with and within the scope of the present invention.

The clutch finds application in motor vehicle drive line components such as a rear (secondary) axles in which it is disposed in pairs to independently control torque supplied to each axle and in other applications where it is advantageous to contain or ground the reaction force generated by and associated with the clutch operator within the clutch structure rather than its housing.

It is thus an object of the present invention to provide a multiple friction plate clutch having an internal reaction force path.

It is a still further object of the present invention to provide a multiple friction plate clutch and operator which are juxtaposed upon an elongate member which functions as the reaction force return path.

It is a still further object of the present invention to provide a multiple plate friction clutch assembly having an internal reaction force path for use in motor vehicle drive lines.

It is a still further object of the present invention to provide a multiple plate friction clutch assembly having an internal reaction force circuit for use in pairs in a rear (secondary) axle independently controlling torque delivery to associated wheels.

It is a still further object of the present invention to provide a multiple friction plate clutch and operator assembly are juxtaposed and assembled upon a common member which functions as a reaction force containing member.

Further objects and advantages of the present invention will become apparent by reference to the following descrip-

DESCRIPTION OF THE PREFERRED EMBODIMENT

Figure 1:
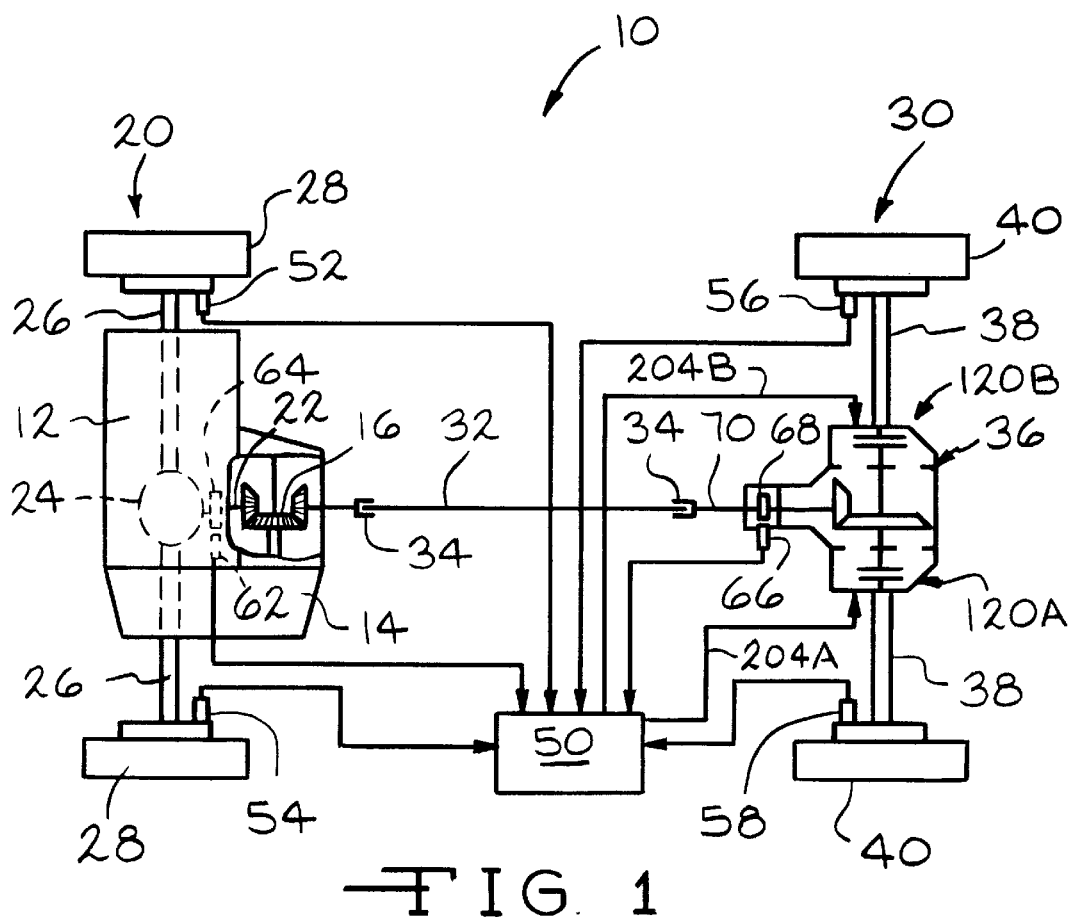
FIG. 1 is a diagrammatic view of a vehicle drive system for a four-wheel vehicle incorporating the twin clutch axle of the present invention.

Referring now to FIG. 1, an adaptive four-wheel vehicle drive train incorporating the present invention is diagrammatically illustrated and designated by the reference number 10. The four-wheel vehicle drive train 10 includes a prime mover 12 which is coupled to and directly drives a transaxle 14. The output of the transaxle 14 drives a beveled or spiral beveled gear set 16 which provides motive power to a primary or front drive line 20 comprising a front or primary propshaft 22, a front or primary differential 24, a pair of live front axles 26 and a respective pair of front or primary tire and wheel assemblies 28. It should be appreciated that the front or primary differential 24 is conventional.

The beveled or spiral beveled gear set 16 also provides motive power to a secondary or rear drive line 30 comprising a secondary propshaft 32 having appropriate universal joints 34, a rear or secondary differential assembly 36, a pair of live secondary or rear axles 38 and a respective pair of secondary or rear tire and wheel assemblies 40. As utilized herein with regard to the secondary differential assembly 36, the terms "differential" and "axle" are used interchangeably to identify a device for receiving drive line torque, distributing it to two transversely disposed wheels and accommodating rotational speed differences resulting from, inter alia, vehicle cornering. As such, the terms are intended to include devices such as the present invention which provide these functions but which do not include a conventional epicyclic gear train.

The foregoing description relates to a vehicle wherein the primary drive line 20 is disposed at the front of the vehicle and, correspondingly, the secondary drive line 30 is disposed at the rear of the vehicle, such a vehicle commonly being referred to as a front wheel drive vehicle. The designations "primary" and "secondary" utilized herein refer to drive lines providing drive torque at all times and drive lines providing supplemental or intermittent torque, respectively. These designations (primary and secondary) are utilized herein rather than front and rear inasmuch as the invention herein disclosed and claimed may be readily utilized with vehicles wherein the primary drive line 20 is disposed at the rear of the vehicle and the secondary drive line 30 and components within the secondary differential assembly 36 are disposed at the front of the vehicle.

Thus, the illustration in FIG. 1, wherein the primary drive line 20 is disposed at the front of the vehicle should be understood to be illustrative rather than limiting and that the components and the general arrangement of components illustrated is equally suitable and usable with a primary rear wheel drive vehicle. In such a vehicle, the primary differential 24 would replace the secondary differential assembly 36 at the rear of the vehicle and the secondary differential assembly 36 would be moved to the front of the vehicle to replace the primary differential 24.

Associated with the vehicle drive train 10 is a microprocessor 50 which receives signals from a plurality of sensors and provides two control, i.e., actuation signals to the secondary differential assembly 36. Specifically, a first sensor such as a variable reluctance or Hall effect sensor 52 senses the rotational speed of the left primary (front) tire and wheel assembly 28 and provides an appropriate signal to the microprocessor 50. Similarly, a second variable reluctance or Hall effect sensor 54 senses the rotational speed of the left primary (front) tire and wheel assembly 28 and provides a signal to the microprocessor 50. A third variable reluctance or Hall effect sensor 56 senses the rotational speed of the right secondary (rear) tire and wheel assembly 40 and provides a signal to the microprocessor 50. Finally, a fourth variable reluctance or Hall effect sensor 58 associated with the left secondary (rear) tire and wheel assembly 40 senses its speed and provides a signal to the microprocessor 50. It should be understood that the speed sensors 52, 54, 56 and 58 may be independent, i.e., dedicated, sensors or may be those sensors mounted in the vehicle for anti-lock brake systems (ABS) or other speed sensing and control equipment. It is also to be understood that an appropriate and conventional counting or tone wheel is associated with each of the speed sensors 52, 54, 56 and 58 although they are not illustrated in FIG. 1.

In order to provide optimum skid or yaw control, the microprocessor 50 also requires information regarding the output speed of the transaxle 14. Accordingly, a variable reluctance or Hall effect sensor 62 which is associated with a tone wheel 64 on the front or primary prop shaft 22 may be utilized. In the alternative, a variable reluctance or Hall effect sensor 66 associated with the secondary differential assembly 36 and positioned adjacent a tone wheel 68 on an input shaft 70 of the secondary differential assembly 36 may also be utilized. The microprocessor 50 includes software which receives and conditions the signals from the sensors 52, 54, 56 and 58 as well as either the sensor 62 or the sensor 66, determines corrective action to improve the stability of the vehicle, maintain control of the vehicle and/or correct and compensate for a skid or other anomalous yaw condition of the vehicle and provides two independent output signals to the secondary differential assembly 36.

Figure 2:
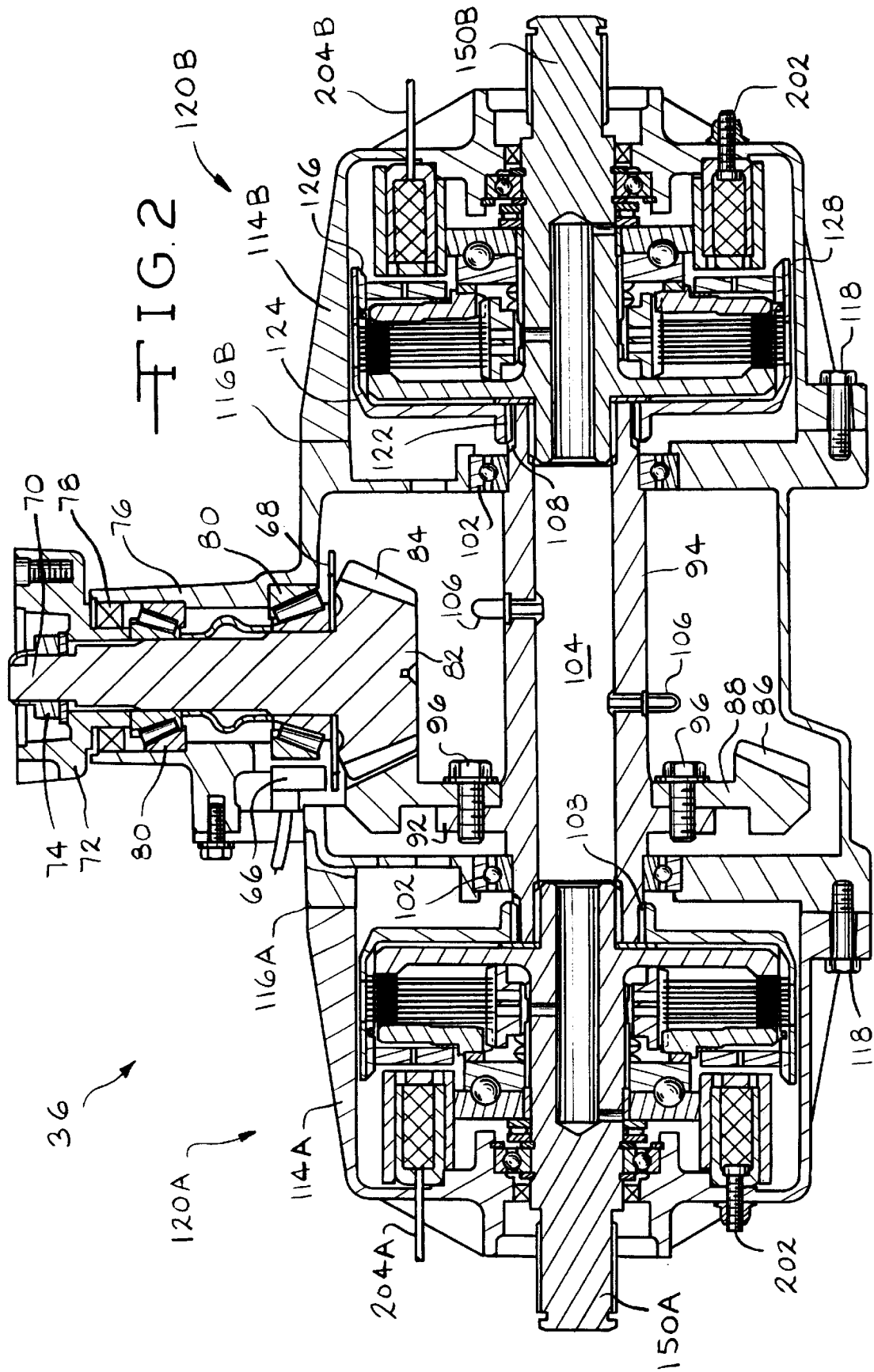
FIG. 2 is a full, sectional view of a twin clutch axle incorporating clutches having internal reaction force circuits according to the present invention and, FIG. 3 is an enlarged, sectional view of a clutch having an internal reaction force circuit according to the present invention.

Referring now to FIG. 2, the input shaft 70 of the secondary differential assembly 36 may include a flange 72 or similar component which is secured to the input shaft 70 by a nut 74 or similar threaded fastener. The flange 72 forms a portion of a connection, such as a universal joint 34 (illustrated in FIG. 1), to the secondary propshaft 32. The input shaft 70 is received within a center housing 76 and is surrounded by a suitable oil seal 78 which provides a fluid impervious seal between the housing 76 and an associated portion of the flange 72 or the input shaft 70. The input shaft 70 is preferably rotatably supported by a pair of anti-friction bearings such as the tapered roller bearing assemblies 80. The input shaft 70 terminates in a hypoid or beveled gear 82 having gear teeth 84 which mate with complementarily configured gear teeth 86 on a ring gear 88 secured to a flange 92 on a centrally disposed tubular drive member 94 by suitable fasteners 96. The tubular drive member 94 is rotatably supported at each end by an anti-friction bearing such as the ball bearing assemblies 102. The tubular drive member 94 defines a hollow interior 104 into which a pair of scavengers or scoops 106 collect and deliver cooling and lubricating fluid from the interior of the center housing 76. The tubular drive member 94 also includes sets of external or male splines or gear teeth 108 adjacent each end.

Figure 3:
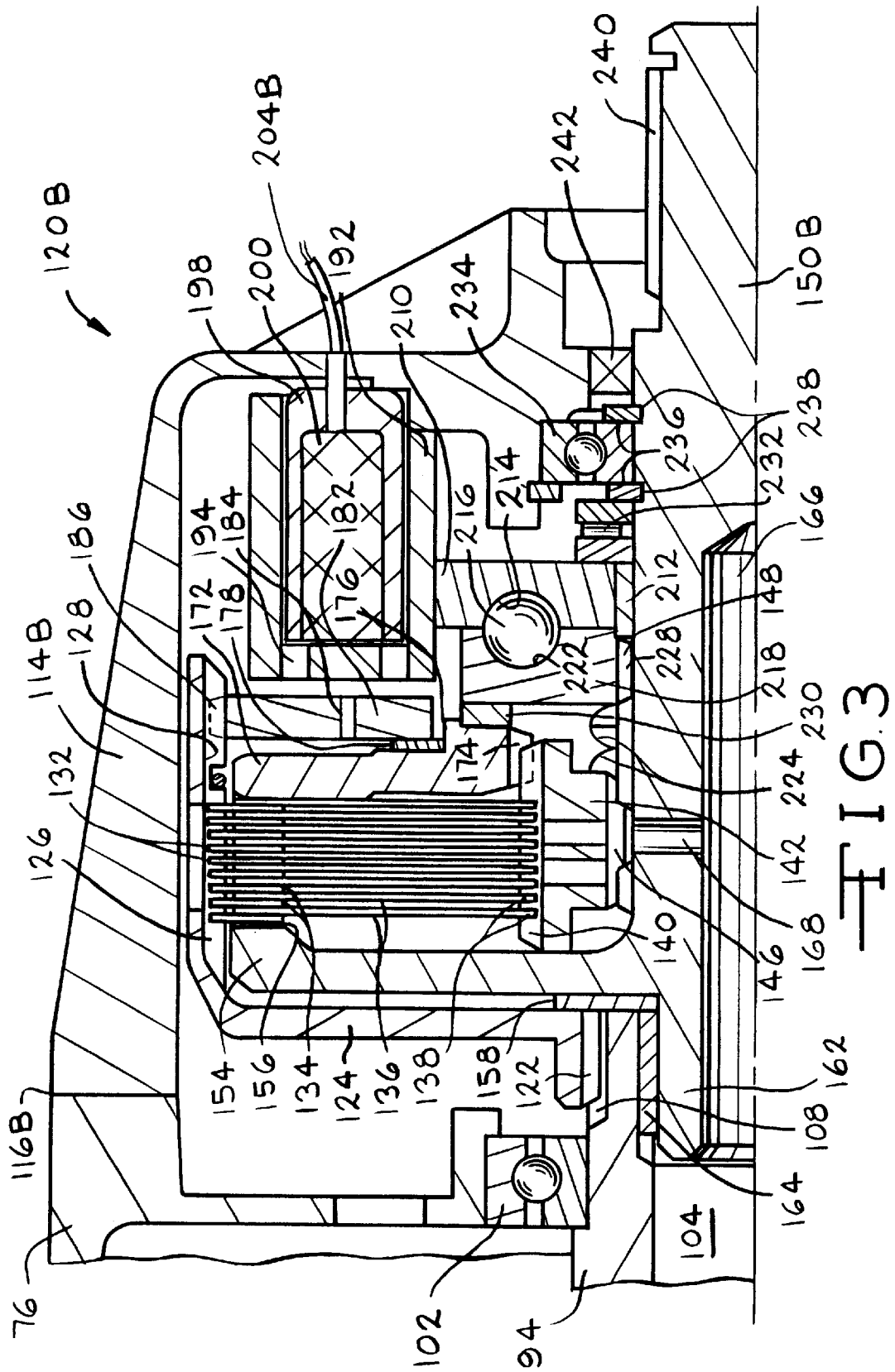

Turning now to FIGS. 2 and 3, the secondary differential assembly 36 includes a pair of left and right outer bell housings 114A and 114B which mate with the center housing 76 along left and right parting lines 116A and 116B and are attached to the center housing 74 by threaded fasteners 118. The housings 114A and 114B are mirror-image, i.e., left and right, components which each receive and house a respective one of a pair of modulating clutch assemblies 120A and 120B. But for the opposed, mirror-image arrangement of the two modulating clutch assemblies 120A and 120B, the components of the two clutch assemblies 120A and 120B described below are identical and thus only the modulating clutch assembly 120B disposed on the right of FIG. 2 and in FIG. 3 will be fully described, it being understood that the left modulating clutch assembly 120A is in all significant respects identical to the right modulating clutch assembly 120B.

Each of the modulating clutch assemblies 120A and 120B is driven by the male or external splines or gear teeth 108 of the tubular drive member 94 which engage complementarily configured female or internal splines or gear teeth 122 on a bell housing 124. The bell housing includes a plurality of female or internal splines 126 on its circumferential inner surface 128. The internal splines 126 are engaged by and rotationally drive complementarily configured male or external splines 132 disposed on a first plurality of larger diameter clutch plates or discs 134. The first plurality of clutch plates or discs 134 includes suitable friction material and surfaces and are interleaved with a second plurality of smaller diameter clutch plates or discs 136.

The second plurality of smaller clutch discs 136 also includes suitable friction material and surfaces and has female splines 138 which engage and rotationally drive complementarily configured male or external splines 140 disposed upon an annulus or collar 142. The collar 142, in turn, includes female or internal splines or gear teeth 146 which mate with complementarily configured male or external splines or gear teeth 148 disposed on the output shaft 150B. The output shaft 150B includes a preferably integrally formed radially extending flange 154 having a flat annular pressure surface 156 against which the friction material of the interleaved pluralities of clutch discs 134 and 136 abuts and aligns. Alternatively, of course, the flange 154 may be a separate component which is secured to the output shaft 150B by any suitable means such as welding or axially restrained thereon by a suitable shoulder or other positive stop.

On the opposite side of the radial flange 154 is a friction reducing flat washer 158 which axially spaces it from the tubular drive member 94 and the bell housing 124. Adjacent the flat washer 158 and disposed between a counterbore in the drive tube 94 and a reduced diameter portion 162 of the output shaft 150B is a friction reducing bushing or journal bearing 164. The output shaft 150B also defines an axial bore 166 which communicates with at least one radial passageway 168 through which cooling and lubricating fluid collected by the scavengers or scoops 106 (illustrated in FIG. 2) may flow to the disc pack clutch assembly 120B.

The disc pack clutch assembly 120B also includes a circular apply plate 172 which includes female or internal splines or gear teeth 174 which mate with the male splines 140 on the collar 142. The apply plate 172 thus rotates with the second plurality of smaller diameter clutch plates 136 and may move axially relative thereto. The apply plate 172 is preferably fabricated of a non-magnetic metal such as stainless steel so that it does not participate in nor interfere with the magnetic circuit (flux path) of the modulating clutch assembly 120B. The apply plate 172 includes a shoulder 176 which positions and receives a flat washer 178. The flat washer 178 reduces friction between the apply plate 172 and a circular armature 182. The circular armature 182 includes a plurality of discontinuous, arcuate, banana slots 184 and a plurality of male splines 186 about its periphery which are complementary to and engage the plurality of female splines 126 on the interior of the bell housing 124. Thus, the circular armature 182 rotates with the bell housing 124 and the first plurality of clutch plates 134.

The circular armature 182 is disposed adjacent a U-shaped circular rotor 192. The rotor 192, which is preferably fabricated of soft iron, includes a pair of spaced apart pluralities of discontinuous, arcuate, banana slots 194 which cooperate with the banana slots 184 in the circular armature 182 to create a sinuous magnetic flux path which improves operation of the disc pack clutch assembly 120B and increases its torque throughput.

The rotor 192 generally surrounds a stationary housing 198 which contains an electromagnetic coil 200. The stationary housing 198 and the electromagnetic coil 200 are secured to the outer housing 114B by a plurality of threaded studs and fasteners 202, two of which are illustrated in FIG. 2. Electrical energy is selectively provided to the electromagnetic coil 200 through a conductor 204B, also illustrated in FIG. 2. Coupled to the rotor 192 by any suitable means such as weldments, interengaging splines or an interference fit and disposed concentrically about the output shaft 150B is a first circular member 210. A low friction collar 212 made of, for example, nylon is interposed the first circular member 210 and the output shaft 150B and thus the first circular member 202 and the rotor 192 are free to rotate about both the output shaft 150B and the housing 198 of the electromagnetic coil 200. The low friction collar 212 reduces friction between the first circular member 210 and the output shaft 150B when the disc pack clutch assembly 120B is deactivated, thereby reduced drag wear and heat generation.

The first circular member 210 includes a plurality of curved ramps or recesses 214 arranged in a circular pattern about the axis of the output shaft 150B. The ramps or recesses 214 represent oblique sections of a helical torus. Disposed within each of the recesses 214 is one of a like plurality of load transferring balls 216 or similar load transferring members which rolls along the ramps defined by the oblique surfaces of the recesses 214. A second circular member 218 is disposed in opposed relationship with the first circular member 210 and includes a like plurality of complementarily sized and arranged ramped recesses 222. The load transferring balls 216 are thus received and trapped within the pairs of opposing recesses 214 and 222, the ends of the recesses being curved and much steeper in slope than the interior regions of the recesses 214 and 222 such that the load transferring balls 216 are retained therein. A plurality of wave washers or Belleville springs 224 are disposed between the second circular member 218 and the collar 142 and bias the second circular member 218 toward the first circular member 210.

It will be appreciated that the plurality of ramped recesses 214 and 222 and the load transferring balls 216 may be replaced with other analogous mechanical elements which cause axial displacement of the circular members 210 and 218 in response to relative rotation therebetween. For example, tapered rollers disposed in complementarily configured conical helices may be utilized.

An important design consideration of the recesses 214 and 222, the load transferring balls 216 and the Belleville springs 224 is that the geometry of their design and the overall clearances in the clutch assemblies 120A and 120B ensure that they are not self-engaging. The modulated clutch assemblies 120A and 120B must not self-engage but rather must be capable of modulated clamping of the clutch plates 134 and 136 and torque transfer in direct, proportional response to the electrical input to the electromagnetic coil 200. Additional details of this mechanism may be found in U.S. Pat. No. 5,492,194 which is hereby incorporated by reference.

The second circular member 218 includes a plurality of female splines or gear teeth 228 which are complementary to and engage the male splines or gear teeth 148 on the output shaft 150B. A flat washer 230 transfers axial force from the second circular member 218 to the apply plate 172. The axial position of the first circular member 210 is established by a thrust bearing assembly 232. Adjacent the thrust bearing assembly 232 is an anti-friction bearing such as a ball bearing assembly 234 which rotatably supports and axially locates the output shaft 150B within the housing 114B. The ball bearing assembly 234 is axially located and restrained by a pair of snap rings 236 which are received within complementarily configured circumferential slots or grooves 238. The output shaft 150B also includes a set of external or male splines or gear teeth 240 which are adapted and intended to mate with complementarily configured female splines, gear teeth or an output flange, shaft or axle (all not illustrated). An oil seal 242 provides an appropriate fluid tight seal between the housing 114B and the output shaft 150B.

A brief description of the operation of the disc pack clutch assembly 120B of the rear differential assembly 36 highlights the improvements and features thereof. When the electromagnetic coil 200 is not energized, the output shaft 150B freewheels relative to the tubular input member 94 which functions as the input drive member. As current flow to the electromagnetic coil 200 commences and increases, drag is created which attempts to slow rotation of the rotor 192, causing relative rotation between the first and second circular members 210 and 218. As this occurs, the load transferring balls 216 ride up the recesses 214 and 222, separate the first and second circular members 210 and 218 and drive the second circular member 218 toward the apply plate 172. Translation of the apply plate 172 compresses the pluralities of clutch discs 134 and 136 and transfers drive torque from the tubular drive member 94 and the bell housing 124 to the collar 142 and the right output shaft 150B. Activation of the left modulating clutch assembly 120A results in corresponding torque transfer to the left output shaft 150A (illustrated in FIG. 2).

It should be noted that the compressive force generated by the first and second circular members 210 and 218 passes through the washer 230, through the apply plate 172, the pluralities of clutch plates 134 and 136, through the radial flange 154 and into the output shaft 150B. Reaction force is thus carried axially along the length of the output shaft 150B, through the snap rings 236, the ball bearing assembly 234 and the thrust bearing 232 and thence back to the first circular member 210. The radial flange 154 on the output shaft 150B and the snap rings 236 thus act as fixed stops which confine the components of the disc pack clutch assembly 120B and direct the reaction force from its operation into and along the output shaft 150B. It will thus be appreciated that the reaction force generated by operation of the disc pack clutch assembly 120B is effectively fully contained within the output shaft 150B and does not pass through the outer housing 114B, the center housing 76 or other components. Such direct containment of the clutch operator reaction force reduces forces and flexure of the housings 76, 114A and 114B and improves the modulating control and service life of the rear differential assembly 36 and its components.

It should also be noted that while the above-described preferred embodiment of a clutch having an internal reaction force circuit utilizes an electromagnetic operator, a piston and cylinder arrangement utilizing either hydraulic fluid or a gas under pressure such as air are all readily adaptable to actuate the clutch pack and realize the features and benefits of the internal reaction force path or circuit of the present invention. Thus, such various clutch actuator configurations are deemed to be well within the scope of the present invention.

Finally, it should be understood that while the output shaft 150B has been described above as the reaction force containing member, the direction of torque flow through the multiple disc pack clutch assembly 120B may readily be reversed or the clutch assembly 120B may be reconfigured such that the shaft 150B is the input shaft. In either case, the shaft 150B functions as the reaction force containing member.

The foregoing disclosure is the best mode devised by the inventor for practicing this invention. It is apparent, however, that apparatus incorporating modifications and variations will be obvious to one skilled in the art of drive line clutch components. Inasmuch as the foregoing disclosure is intended to enable one skilled in the pertinent art to practice the present invention, it should not be construed to be limited thereby but should be construed to include such aforementioned obvious variations and be limited only by the spirit and scope of the following claims.

I claim:

1. A clutch assembly for use in a drive line of a motor vehicle comprising, in combination, an input, an output, a modulating clutch disposed between said input and said output, said modulating clutch having a first plurality of clutch discs disposed for rotation with said input, a second plurality of clutch discs interleaved with said first plurality of clutch discs and disposed for rotation with said output and a clutch operator for compressing said first and said second pluralities of clutch discs, and an elongate member having an integral flange and a stop spaced from said flange, said flange including a surface adapted to restrain said pluralities of clutch discs, said modulating clutch disposed on said elongate member between said integral flange and said stop, whereby reaction force generated during clutch operation is contained in said elongate member.

2. The clutch assembly of claim 1 wherein said elongate member is said output.

3. The clutch assembly of claim 1 wherein said stop includes at least one snap ring received in a circumferential groove in said elongate member.

4. The clutch assembly of claim 1 further including a second output, a second modulating clutch and a second elongate member.

5. The clutch assembly of claim 1 wherein said clutch operator includes a stationary electromagnetic coil, a rotor partially surrounding said electromagnetic coil, an armature disposed adjacent said rotor and a ball ramp operator having a pair of opposed circular members defining complementarily configured opposed ramped recesses and rolling members disposed in said recesses whereby relative rotation of said circular members translates said circular members axially.

6. The clutch assembly of claim 5 further including a low friction collar and wherein one of said circular members is secured to said rotor and said low friction collar is disposed between said one of said circular members and said elongate member.

7. The clutch assembly of claim 1 further including a non-magnetic apply plate operably disposed between said clutch operator and said interleaved pluralities of clutch discs.

8. A clutch assembly for use in a motor vehicle drive line component comprising, in combination, a first member, a second member having an integral flange and a stop, said integral flange defining an annular surface, a modulating clutch operably disposed between said first member and said second member, said modulating clutch having a first plurality of clutch discs disposed for rotation with said first member, a second plurality of clutch discs interleaved with said first plurality of clutch discs and disposed for rotation with said second member and an operator for applying force to said first and said second pluralities of clutch discs, said modulating clutch disposed on said second member between said surface of said integral flange and said stop, whereby reaction force generated during clutch operation is contained in said second member.

9. The clutch assembly of claim 8 wherein said first member is an input and said second member is an output.

10. The clutch assembly of claim 8 wherein said annular surface of said integral flange is adapted to restrain said pluralities of clutch discs and said stop is a snap ring on said second member.

11. The clutch assembly of claim 8 further including an additional second member, a second modulating clutch assembly coupled to said first member, and a housing for receiving said members and said clutches.

12. The clutch assembly of claim 8 wherein said operator includes a stationary electromagnetic coil, a rotor partially surrounding said electromagnetic coil, an armature disposed adjacent said rotor and a ball ramp device having a pair of opposed circular members including complementarily configured opposed ramped recesses and rolling members disposed in said recesses.

13. A twin clutch axle comprising, in combination, an input member, a gear set driven by said input member and having an output member disposed perpendicularly to said input member, a pair of clutches, each of said clutches having an input driven by said output member, a reaction member having an integral flange defining a surface and a stop, a multiple disc clutch disposed on said reaction member between said surface of said integral flange and said stop and operatively disposed between said input and said reaction member and a clutch actuator disposed on said reaction member adjacent said multiple disc clutch and between said flange and said stop for applying force to said multiple disc clutch, whereby reaction force generated during clutch operation is contained in said reaction member.

14. The twin clutch axle of claim 13 wherein said surface of said integral flange is aligned with said multiple disc clutch.

15. The twin clutch axle of claim 13 wherein said clutch operator includes a stationary electromagnetic coil, a rotor partially surrounding said electromagnetic coil, and an armature disposed adjacent said rotor.

16. The twin clutch axle of claim 13 further including an electromagnetic coil, a rotor partially surrounding said electromagnetic coil, a circular member secured to said rotor and a low friction collar disposed between said circular members and said reaction member.

17. The twin clutch axle of claim 13 further including a tone wheel disposed for rotation with said input member and each of said reaction members and a sensor disposed in sensing relationship with each of said tone wheels.

18. A clutch assembly for use in a motor vehicle drive line component comprising, in combination, a reaction member having an integral flange and a stop, said flange including an annular surface, a modulating clutch disposed on said reaction member between said annular surface of said integral flange and said stop, said modulating clutch having a first plurality of clutch discs, a second plurality of clutch discs interleaved with said first plurality of clutch discs and a clutch operator for compressing said first and said second pluralities of clutch discs, said clutch operator including a stationary electromagnetic coil, a rotor operably associated with said electromagnetic coil, a cam assembly disposed operably adjacent said pluralities of clutch discs for generating compressive force upon energization of said electromagnetic coil.

* * * * *